March 4, 1930.  J. C. M. DES ISLETS  1,749,473
ROOF STRUCTURE
Filed Oct. 28, 1927  3 Sheets-Sheet 1
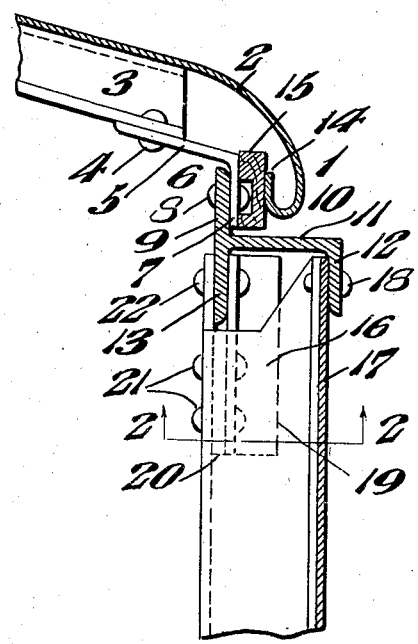
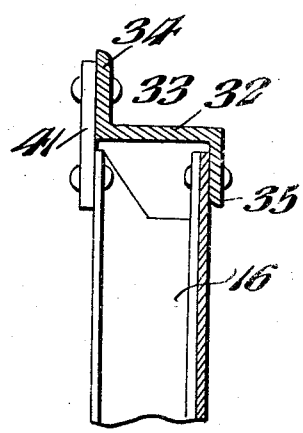
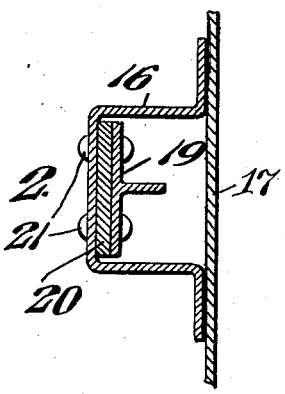
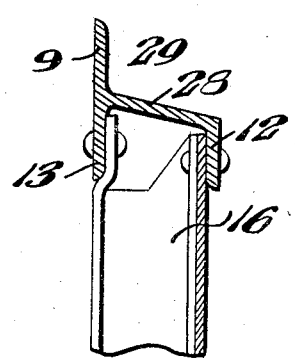
Inventor
JOHN C. M. DES ISLETS,
By William J. Jackson
Attorney March 4, 1930. J. C. M. DES ISLETS 1,749,473
ROOF STRUCTURE
Filed Oct. 28, 1927 3 Sheets-Sheet 2
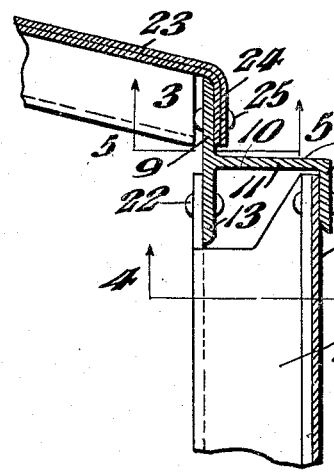
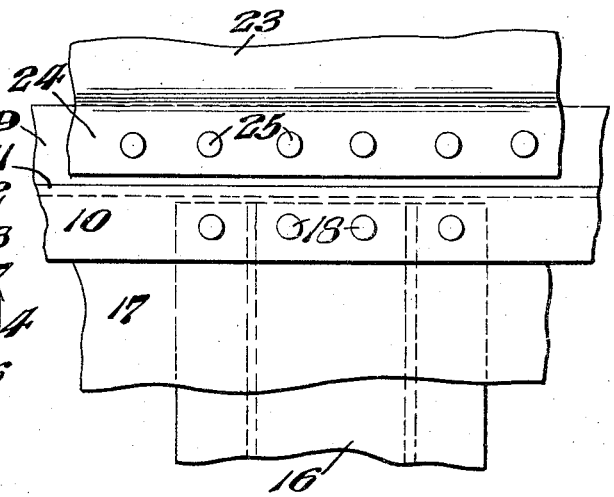
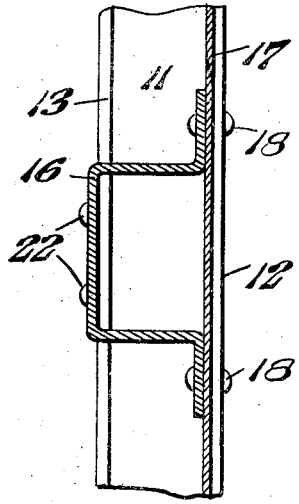
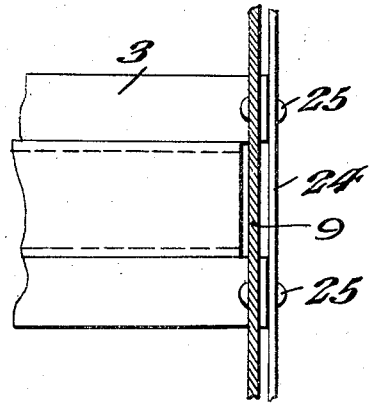
Inventor
JOHN C. M. DES ISLETS,
Attorney March 4, 1930. J. C. M. DES ISLETS 1,749,473
ROOF STRUCTURE
Filed Oct. 28, 1927  3 Sheets-Sheet 3
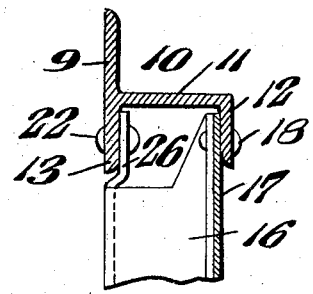
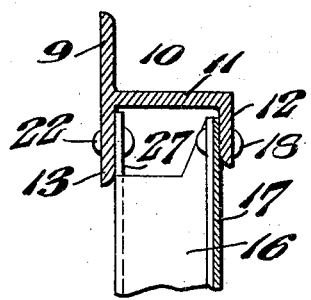
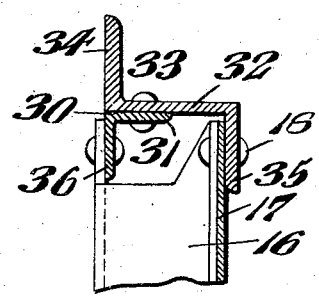
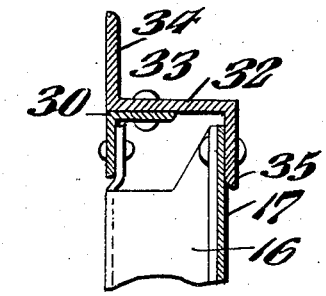
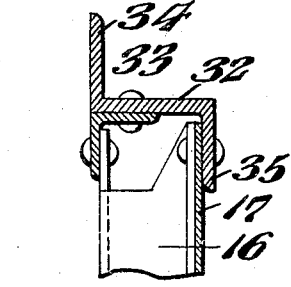
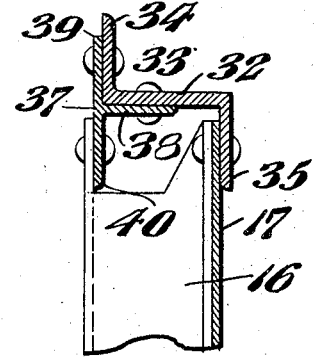
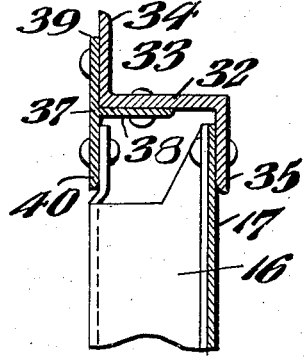
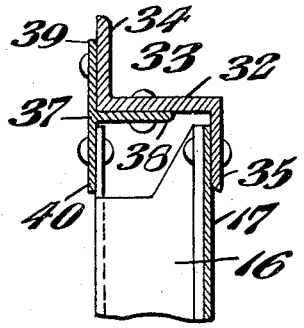
Inventor
JOHN C. M. DESISLETS,
By William J. Jackson
Attorney Patented Mar. 4, 1930

1,749,473

UNITED STATES PATENT OFFICE

JOHN C. M. DES ISLETS, OF BETHLEHEM, PENNSYLVANIA

ROOF STRUCTURE

Application filed October 28, 1927. Serial No. 229,296.

The liability of corrosion of the metal of which steel cars, house cars, passenger cars, and other rolling equipment are made constitutes a great objection to the use of steel in the manufacture of such cars, and one object of my invention is to eliminate and reduce the liability of such corrosion by avoiding external crevices through which water may secure entrance to the interior of the vehicle.

My invention comprises a novel construction of a special section side plate having an inner upper extending and a lower pendant flange, a horizontal or laterally extending web, and an outer pendant flange adapted to be secured to the sheet and side post and said upper extending flange being adapted to be secured to the roof sheets and carlines in such a manner that the outside of the car or similar structure will be nearly smooth and so constructed that it will tend to shed the water more completely and to furnish no shoulders or crevices to catch and hold moisture and induce corrosion nor holes through which moisture may enter as has been the case heretofore with some other constructions.

By my invention I have produced a novel construction of side plate which furnishes the necessary stiffness and strength for the car top at this point without other framing, and also takes up by its own elasticity and deflections produced by the yielding of the whole car body when it receives severe shocks as cars of this character receive at times since it is well known that many forms of metal roofs are seriously injured by the distortions produced in the car body by severe shocks.

To the above ends, my invention consists of a novel construction of special section side plate and a novel means of assembling the same with respect to the side posts, side sheets, and roof sheets.

The invention consists of the novel construction hereinafter described and finally claimed.

The nature, characteristic features and scope of the invention will be more fully understood from the following description taken in connection with the accompanying drawings forming part hereof, and in which:

Fig. 1, is a vertical sectional view, partly in elevation, of a novel roof structure embodying my invention.

Fig. 2, is a horizontal section on line 2—2 of Fig. 1.

Fig. 3, is a view similar to Fig. 1 showing another embodiment of my invention wherein the filler pieces are omitted.

Fig. 4, is a horizontal section on line 4—4 of Fig. 3.

Fig. 5, is a horizontal section on line 5—5 of Fig. 3.

Fig. 6, is a side elevation of Fig. 3.

Figs. 7 and 8 represent sectional views of my novel special section side plate, the side post and side sheet being shown in elevation.

Fig. 9, represents in section a modified construction of my special section side plate, the side post and side sheet being shown in elevation.

Figs. 10, 11, and 12 represent sectional views of a side plate in the shape of a Z-bar showing an angle and side post used in connection therewith.

Figs. 13, 14, and 15 represent sectional views of a side plate consisting of a T-bar used in connection with a Z-bar, the side post and side sheet being shown in elevation.

Fig. 16, is another embodiment of my invention consisting of a plate used in connection with a Z-bar, the side post and side sheet being shown in elevation.

For the purpose of illustrating my invention I have shown in the accompanying drawings several forms thereof which are at present preferred by me, since the same have been found in practice to give satisfactory and reliable results, although it is to be understood that the various instrumentalties of which my invention consists can be variously arranged and organized and that my invention is not limited to the precise arrangement and organization of the instrumentalities as herein shown and described.

Similar numerals of reference indicate corresponding parts.

1 designates my novel assembly or construction of roof sheets, side posts and their adjuncts, wherein 2 designates the roof sheets, which are bolted down to the carlines 3, in any conventional manner, said carlines being riveted or otherwise secured, at the points 4, to the flange 5 of the angle iron 6, whose pendant flange 7 is secured at the points 8 to the vertical flange 9 of the special section side plate 10, which is composed of the lateral or horizontal member 11 having the outer pendant flange 12 and the inner pendant flange 13, which latter aligns with said said vertical flange 9. The roof sections 2 have the inwardly deflected lip or flange 14, which abuts against the wood filler 15, which may be used if desired, said filler being interposed between the flanges 14 and 7. 16 designates the side post whose contour in cross section will be understood from Fig. 2, and 17 the side sheet, the upper end of the latter being riveted or otherwise secured at 18 to the inner wall of the pendant flange 12. 19 designates the side post stiffener, which may be employed if desired, and 20 designates a filler, said side post stiffener and filler being assembled by the rivets or the like 21, the upper inner portion of said side post being riveted at 22 to the flange 13.

It will be apparent that in the foregoing description where I have referred to rivets or the operation of riveting, that the various elements may be welded, and that all parts already referred to, or to be hereafter referred to, which are shown as riveted may be welded if desired. The foregoing description of Figs. 1 and 2 relates more particularly to a bolted type roof, and in Figs. 3 to 6, which will next be referred to, I have shown a riveted roof wherein I employ the same special section side plate 10 already referred to and side posts 16 of the same character as already described, it being, however, apparent that I have omitted the filler 15. In the construction seen in Figs. 3 to 6 the special section side plate 10 is of the same construction and formation as the side plate 10, already described with reference to Fig. 1. The roof sheets in Figs. 3 and 6 are designated as 23 and are provided with the pendant terminal flanges 24 which are riveted at the points 25 to the upper flange 9 of the special side plate 10. The side post 16 and the side sheet 17 are riveted to the pendant flanges 12 and 13 of the side plate 10 by means of the rivets 18 and 22, as already described with reference to Fig. 1, and it will be evident from Figs. 1 and 3 that by my novel construction and employment of the side plate 10 assembled as already described, there will be no crevices on the surface 11 for water, sleet, snow, or moisture to collect so that there is no liability of corrosion or leakage at this point or along its surface.

In the construction seen in Fig. 7 I have shown the same construction of special section side plate 10 as already described with reference to Figs. 1 and 3. In the construction seen in Fig. 7 the side post 16 and the side sheet 17 are secured to the pendant outer flange 12 by the rivets 18 as already described, but the rear portion 26 of the side post 16 is secured to the inner wall of the pendant flange 13 by rivets 22, said portion 26 being deflected inwardly, as will be apparent from Fig. 7.

In the construction seen in Fig. 8 the side post 16 and the side sheet 17 are secured to the pendant flange 12 by the rivets 18, as already described. The rear upper portion 27 of the side post is, however, not deflected inwardly as seen in Fig. 7, but it is on the same plane as the rear wall of the side post, being secured in position by the rivets 22 as already described.

In the construction seen in Fig. 9 I have shown substantially the same construction of special side plate 10 as already described except that the web or surface 28 instead of being horizontal as seen in the constructions already described, inclines downwardly. In Fig. 9 I have designated the special section side plate as 29 and the same is provided with an inclined web or wall 28, already referred to, the pendant outer flange being designated as 12 in the other constructions and the upper and lower inner flanges being designated as 9 and 13 as in the other constructions referred to. The side post 16 is of the same construction as already described, as is evident.

In Figs. 10, 11, and 12 I have shown the side plate as consisting of an angle 30 having its flange 31 riveted to the member 32 of a Z-bar 33, the latter being provided with an upwardly extending flange 34 and the pendant flange 35. The side post 16 and the side sheet 17 are riveted to the pendant flange 35 by the rivets 18, while the rear upper portion of the side post 16 is riveted to the pendant flange 36 of the angle 30. The construction seen in Figs. 11 and 12 need not be described in detail as they are substantially the same as seen in Fig. 10, the Z-bar 33 and the angle 30 being employed in each instance in conjunction with the side post 16, and the manner of riveting the upper portions of the side post to the Z-bar and angle will be readily understood without further description.

In the constructions seen in Figs. 14, 15, and 16 I have shown other embodiments of my invention wherein the side plate consists of a T-bar 37 having its central web or flange 38 in each instance riveted to the underside of the Z-bar 33. The upper flange 39 of the T-bar is riveted to the inner surface of the upper flange 34 of the Z-bar while the lower flange 40 of the T-bar is riveted to the upper portion of the side post, as will be understood from said Figs. 13, 14, and 15. In the construction shown in Fig. 16 I have shown the Z-bar 33 of the same construction as already described with reference to Figs. 10 and 15, the upper portion of the side post 16 being riveted thereto in the manner shown, there being a plate or bar 41 common to the flange 34 of the Z-bar and the upper rear portion of said side post.

By my novel construction it will be apparent that I have produced an absolutely weather-tight roof wherein the making of repairs on the roof side plate or post is greatly facilitated, and it will be further apparent that my special section 10 has higher section modulus for the same weight per foot. It will also be apparent that my novel construction is easier to build and apply if either a riveted roof, as seen in Figs. 3 to 6, or a bolted roof, as seen in Fig. 1, is desired. The roof structure can be erected in either case as a separate unit in jigs and readily applied to the car without the necessity of applying each roof sheet separately as is now the case with the bolted roof seen in Fig. 1.

What I claim is:

1. In a device of the character stated, a side plate composed of a laterally extending web, inner upper extending and lower pendant flanges and an outer pendant flange all of integral structure, roof sheets having a terminal pendant portion adapted to be secured to said upper flange, and side posts having their upper portions secured to said inner and outer pendant flanges of said side plate.

2. In a device of the character stated, a side plate composed of a laterally extending web, inner upper extending and lower aligning pendant flanges and an outer pendant flange all of integral structure, roof sheets having a terminal pendant portion adapted to be secured to said upper flange, side posts having their upper portions contiguous to the inner and outer pendant flanges of said side plate and secured thereto, and side sheets having their upper ends secured within said outer pendant flange of said side plate.

3. In a device of the character stated, a side plate, composed of a laterally extending web, an inner upper flange, an inner lower pendant aligning flange, and an outer pendant flange all of integral structure, roof sheets having a terminal pendant portion deflected into proximity to said upper flange, carlines for said roof sheets, and side posts having their upper ends secured to said inner and outer pendant flanges.

4. In a device of the character stated, the combination of a side post, a side plate secured to the upper portion thereof, and comprising a laterally extending web having an inner upwardly extending flange, an inner pendant flange, and an outer pendant flange all of integral structure, said inner upwardly extending flange being adapted to have a roof sheet secured thereto.

5. In a device of the character stated, the combination of a side post, a side plate secured to the upper portion thereof, and comprising a laterally extending web having an inner upwardly extending flange, an inner pendant flange in alignment therewith, and an outer pendant flange all of integral structure, said inner upwardly extending flange being adapted to have a roof sheet secured thereto.

6. In a device of the character stated, a side plate having an inner upper flange, a lower pendant aligning flange, and a laterally extending web terminating in an outer pendant flange, roof sheets supported above said side plate and having their outer terminals deflected downwardly, a filler interposed between the ends of said side sheets and said upper flange, side posts having their upper ends secured to the inner and outer pendant flanges of said side plate, and a filler and a stiffener secured to said side post.

7. In a device of the character stated, a side plate having an inner upper and lower pendant flange, a laterally extending web terminating in an outer pendant flange, roof sheets supported above said side plate, and having their outer terminals deflected downwardly, a filler interposed between the ends of said roof sheets and said upper flange, side posts having their upper ends secured to the inner and outer pendant flanges of said side plate, a filler and a stiffener secured to said side post, and a side sheet having its upper end secured within the outer pendant flange of said side plate.

8. As a new article of manufacture, a side plate having a laterally extending web, an inner upwardly extending flange, an inner pendant flange in alignment with said upper flange, and an outer pendant flange within which latter side posts and side sheets are adapted to be secured said plate and flanges being of integral structure.

JOHN C. M. DES ISLETS.